UNITED STATES PATENT OFFICE.

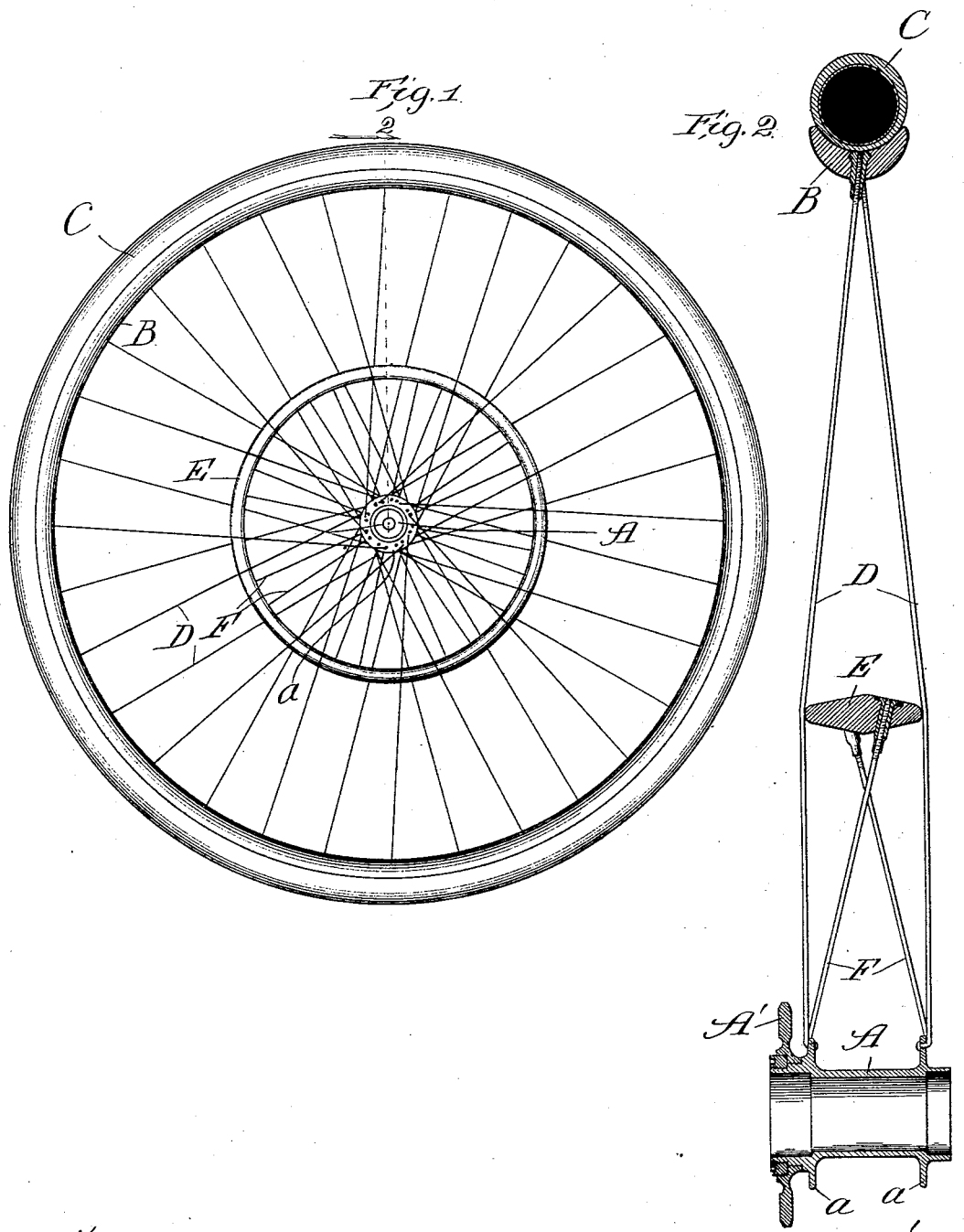

EMILE AZE, OF CHICAGO, ILLINOIS, ASSIGNOR, BY MESNE ASSIGNMENTS, OF ONE-HALF TO FRANK THOMAS FOWLER, OF SAME PLACE.

VEHICLE-WHEEL.

SPECIFICATION forming part of Letters Patent No. 573,635, dated December 22, 1896.

Application filed March 23, 1896. Serial No. 584,416. (No model.)

*To all whom it may concern:*

Be it known that I, EMILE AZE, a citizen of the United States, residing at Chicago, Illinois, have invented certain new and useful Improvements in Vehicle-Wheels, of which the following is a specification.

The object of my invention is to lessen the thickness of a wheel at its hub or axis without diminishing its strength or ability to resist transverse vibrations; and my invention consists in the features and details of construction hereinafter described and claimed.

In the drawings, Figure 1 is a side elevation of one of my improved wheels, and Fig. 2 a vertical section taken in line 2 of Fig. 1.

In making my improved vehicle-wheel I have chosen to represent it as a bicycle-wheel; but I do not mean to limit myself to this class of vehicles, as my invention is equally applicable to wheels used in connection with other vehicles. I make a hub A, provided with flanges $a$, to which the spokes are to be attached, and where the wheel is intended for use on a bicycle I provide it with the usual sprocket-wheel A'. I make a rim B of the usual construction adapted to receive and retain a tire C where the wheel is intended for use on a bicycle, as represented in the drawings. I arrange the desired number of steel wire or rod spokes D, which run from the rim to the flanges on the hub adapted to receive them. These spokes may be arranged tangential to the center of the wheel, as shown and as is usual in such cases. In order, however, to enable the spokes to be attached to the hub close together, so as to diminish the width of the wheel at its hub or axis, while at the same time securing the strength and bracing properties that result from the attachment of the spokes at the hub a wider distance apart, I employ a ring E, which is preferably of a size to encircle the hub at a point a little less than half the distance between the hub and the rim, although I do not confine myself to any specific distance from the hub at which this ring is to be arranged. I make this ring preferably of the same width in cross-section as the distance between the flanges on the hub, although I do not confine myself to these exact dimensions. This ring serves to brace or hold the spokes apart at a point where it contacts with them the distance of its width, while permitting the inner ends of the spokes to be drawn in, so that their course from the bracing-ring to the flanges on the hub to which they are attached will be in a vertical direction when viewed as shown in Fig. 2. The ring E is held and supported in place by short secondary spokes F, which are attached at their inner ends to the flanges on the hub of the wheel and which are connected with and end at the ring E at their outer ends. By looking at Fig. 2 it will be seen that by bringing the spokes in from the ring E in a vertical direction their inner ends where attached to the flanges on the hub are much closer together than if the ring E were dispensed with and the spokes continued at the same angle which they occupy from the rim B to the ring E. This enables me to make a wheel of less width at its hub or axis, while at the same time retaining and securing the strength and bracing properties that would be secured were the spokes continued at the same angle from the rim to the hub and a much greater length employed. In addition to this I consider that I get with spokes which extend from the rim to the hub the same strength and bracing qualities that I would get with spokes no longer than sufficient to extend from the rim to the bracing-ring, which of course makes a wheel with my improvements much stronger than one without them.

What I regard as new, and desire to secure by Letters Patent, is—

1. In a vehicle-wheel, the combination of a hub, a rim, a bracing-ring interposed between the hub and the rim, and spokes proceeding from the rim to the bracing-ring at one angle and from the bracing-ring to the hub at another angle, substantially as described.

2. In a vehicle-wheel, the combination of a hub, a rim, a bracing-ring interposed between the hub and the rim, secondary spokes extending from the hub to and ending at the bracing-ring, and spokes extending from the hub to the rim and contacting with the edges of the bracing-ring, substantially as described.

EMILE AZE.

Witnesses:
THOMAS B. MCGREGOR,
THOMAS A. BANNING.